C. H. HUBBARD & G. RUPPERT.
FAUCET FOR DELIVERING MOLTEN GLASS.
APPLICATION FILED MAY 8, 1916.
1,200,195.
Patented Oct. 3, 1916.
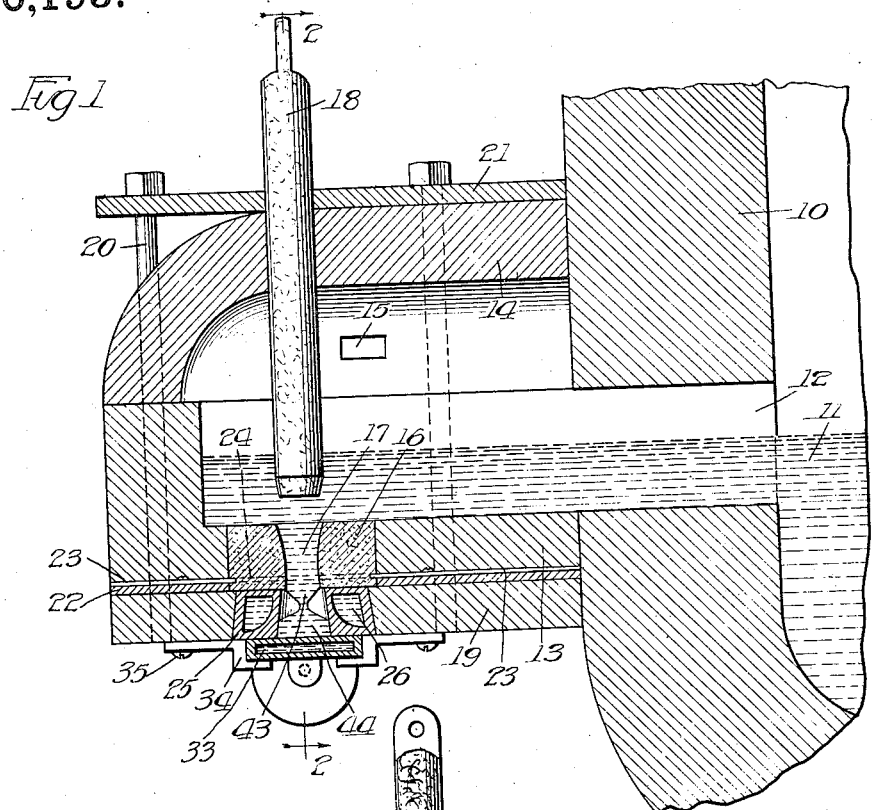
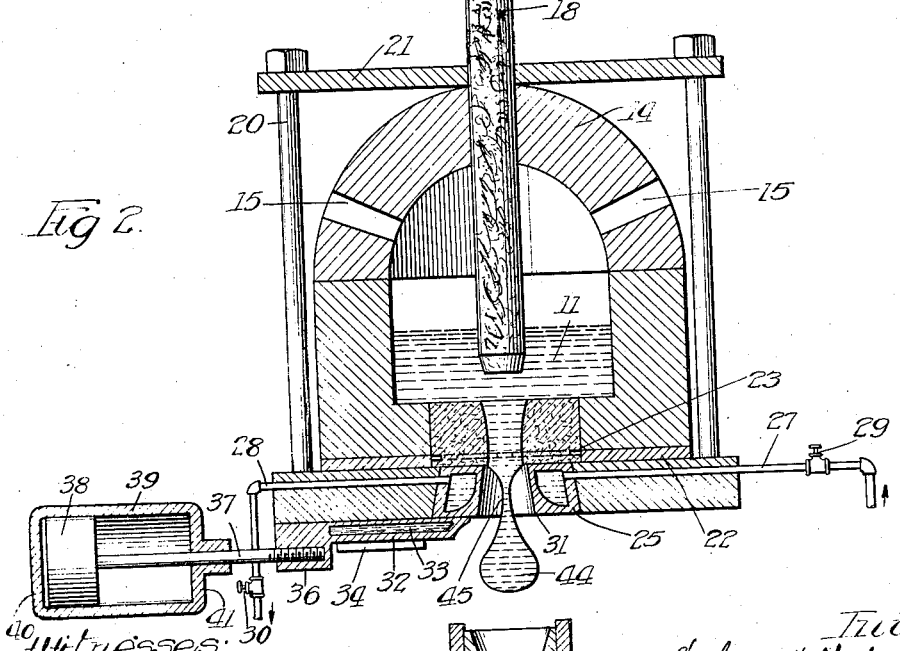
Witnesses:
Arthur W. Carlson
Victor Siljander
Inventors
Charles H. Hubbard + George Ruppert.
By Offield Towle Graves + Offield Attys

UNITED STATES PATENT OFFICE.

CHARLES H. HUBBARD AND GEORGE RUPPERT, OF SAND SPRINGS, OKLAHOMA, ASSIGNORS TO ALEXANDER H. KERR, OF SAND SPRINGS, OKLAHOMA.

FAUCET FOR DELIVERING MOLTEN GLASS.

1,200,195.   Specification of Letters Patent.   Patented Oct. 3, 1916.

Application filed May 8, 1916. Serial No. 96,116.

*To all whom it may concern:*

Be it known that we, CHARLES H. HUBBARD and GEORGE RUPPERT, both citizens of the United States, residing in the city of Sand Springs, county of Tulsa and State of Oklahoma, have invented certain new and useful Improvements in Faucets for Delivering Molten Glass, of which the following is a specification.

Our invention relates to improvements in faucets for delivering molten glass, and is particularly well adapted for use in connection with glass furnaces where it is desired to withdraw regulated quantities of molten glass from the furnace at suitable intervals.

The objects of the invention are, to provide a device of the class described in which the flow of glass from the receptacle may be arrested from time to time without danger of clogging the discharge orifice; to provide a faucet which is capable of delivering any desired quantity of molten glass when the same is open; to provide a construction in which the operation need not be automatic but may preferably be arranged for manual control; to provide a construction such that the skill of the operator may be used in order to determine the precise quantity of molten glass which shall be delivered from the furnace whenever the faucet is opened; to provide a construction so organized that the rate of flow of the molten glass through the faucet may be regulated at will; to provide a construction which shall be absolutely non-clogging, even if the faucet be maintained in closed condition for a length of time greater than the regular interval between successive openings of the device; to provide a construction by which the fluidity or plasticity of the molten glass may be regulated at will, independently of the fluidity of the molten glass contained in the furnace; to provide a device which shall be simple and inexpensive to construct and efficient and economical to operate and maintain, and, in general, to provide an improved construction of the character referred to.

In the drawings which illustrate a preferred embodiment of our invention, Figure 1 is a vertical section of a fragmentary portion of the tank of a glass furnace to which our invention is applied; and Fig. 2 is a section taken on the line 2—2 of Fig. 1.

In the drawings, 10 represents the side or breast of the tank of a glass furnace containing molten glass 11. In the side of the tank we provide at the proper level an aperture or conduit 12 which communicates with a trough or boot 13 secured to the side of the tank. Said boot 13 is furnished with a cover portion 14 the opposite sides of which are perforated, as shown at 15, in order to admit streams of gaseous fuel for the purpose of heating the molten glass contained within the trough or boot 13 and so maintaining the proper degree of fluidity. The boot 13 and cover 14 are made of a refractory fire clay or other suitable fire-proof material, as is also the bushing 16 which is seated in the floor of the boot 13 and which is apertured, as shown at 17, in order to provide a discharge orifice for the molten glass. When it is desired to discontinue the delivery of glass from the tank for any extended period, we prefer to close the upper end of the aperture 17 by means of a fire clay plug or rod 18 which may be raised or lowered through an aperture in the cover 14 in any suitable manner. Under the floor of the boot we mount a rather thick heavy plate 19 of cast-iron or similar material which is supported by means of four rods or bolts 20 depending from a plate 21 placed on the top of the cover 14.

Between the plate 19 and the floor of the boot 13 we prefer to interpose a subsidiary metal plate 22 which surrounds the lower end of the clay bushing 16, and to which are detachably secured, in any suitable manner, on its upper side, a plurality of bars or rods 23 the inner ends of which enter a circumferential groove 24 cut in the exterior of the clay bushing 16. This arrangement makes it convenient to remove or replace the clay bushing 16 whenever desired. Immediately below the clay bushing 16 and concentric with its aperture 17 we insert in the plate 19 a removable metal bushing 25, the aperture in which is at its upper end slightly larger than the aperture 17 in the clay bushing, the diameter of the aperture at the lower end being also greater than at the upper end. The walls of said bushing 25 are made thick enough to accommodate an annular water chamber or jacket 26 for the purpose of cooling said metal bushing 25. A flow of cooling water through or around said water jacket 26 is furnished by means of an inlet pipe 27 and an outlet pipe 28 communicating at diametrically opposite points with the upper part of the water chamber. The flow of cooling fluid may be regulated by a pair of valves 29 and 30 arranged respectively in the inlet and exhaust pipes 27 and 28.

The bottom of the metal bushing 25 is turned or dressed off so as to constitute a smooth sharp shearing edge 31 with which coöperates a horizontally reciprocable shear blade 32 for the purpose of severing the stream of molten glass issuing from said bushing. The shear member 32 also, after its shearing movement, constitutes a gate which closes the bottom of the metal bushing 25 and thus arrests the further flow of molten glass. Said shear blade or gate member 32 may if desired be water cooled as at 33, the cooling fluid being conveyed to the shear blade by means of flexible conduits, in any well known manner.

The gate member or shear blade 32 is guided and maintained in working engagement with the bottom of the bushing 25 by means of a pair of opposed guide members 34 which are suitably secured to the under side of the plate 19 as by screws 35. The outer end of the gate member 32 is formed with a boss 36 for the reception of the rod 37 which actuates the shear blade through a piston 38 reciprocable in an air cylinder 39. It is understood that compressed air may be admitted to or exhausted from either end of the cylinder 39 by way of the ports 40 and 41, which may be controlled by any well known form of valve, the arrangement being such that the operator may move the gate member or shear in either direction at will.

In Fig. 2 we have shown diagrammatically a mold 42, which may be one of a series of molds of a glass-molding machine and arranged to be moved successively into a position directly beneath the faucet so as to receive a supply of molten glass issuing therefrom. It should be understood, however, that the faucet is capable of being utilized with any type of mold or molding apparatus.

Describing the operation of the apparatus, Fig. 1 shows the condition a short time after the gate member has been moved inwardly by means of the piston 38 so as to arrest the flow of glass into the mold. In said Fig. 1 it will be observed that immediately below the discharge orifice 17 in the clay bushing 16 the molten glass issuing from the clay bushing is conical in shape, as at 43. When the flow of cooling water through the water chamber 26 is properly regulated by means of the valves 29 and 30, the outside of said cone-shaped stream is considerably cooler and consequently harder and less fluid than the central portion of the cone-shaped discharge. The result is that the flow of glass takes place only at the lower end of the cone where the glass issuing from the bushing 16 possesses the greatest degree of fluidity.

In Fig. 1 it will be seen that the molten glass which has flowed out of the end of the cone-shaped discharge 43 has accumulated upon the top of the gate member, as shown at 44, and is in the act of sealing the end of the cone 43, thereby arresting further flow of molten glass into the cavity of the bushing 25. It should be understood that the cooling of the water chamber 26 effects a slight hardening of the upper surface of the body of glass 44 and assists in preventing the body of glass 44 from quite filling up the cavity in the bushing 25, even though the gate member 32 be left in closed position for a considerable length of time. When a new mold 42 has been brought into register beneath the faucet and whenever the operator is ready to fill said mold, the gate member 32 is withdrawn and the body of glass 44, which has accumulated in the water-cooled cavity, drops by gravity into the mold, as shown in Fig. 2 of the drawings. When this occurs, the flow of glass out of the lower end of the cone 43, which has been arrested by the accumulation of the body of glass 44 on top of the gate member, recommences. The weight of the gob 44 is of great importance in effecting a resumption of the flow of glass, by reason of the fact that its weight is sufficient to break the hardened connection between the cone 43 and the gob. The central or fluid portion of the cone 43 is thus drawn down by the falling gob and the glass flows out of the lower end of the clay bushing, as shown in Fig. 2. When a sufficient quantity of molten glass has dropped into the mold, the operator cuts through the narrow neck 45 by means of the forward movement of the shear, thereby arresting the further flow of glass.

By means of the valves 29 and 30 the operator is able to control the fluidity of the glass and the rate of flow. The fluidity of the gob may also to some extent be regulated by the length of time during which the gate member 32 is maintained in closed position. Where the apparatus is employed in conjunction with an automatic glass-molding machine, the manual control makes it possible to regulate the operation with great nicety by reason of the fact that it is a simple matter to lengthen the intervals between the successive shear movements and thereby cool off the gobs of glass if the molds or other parts of the glass-molding machine are becoming too hot, or in case the glass which is deposited in the molds is found to be of too high temperature.

So far as we are aware, we are the first to employ an apparatus employing an intermittent flow and in which it is possible to absolutely arrest the flow of glass between successive discharges. This method of operation has important advantages over apparatus of the continuous flow type, in which the quantity of glass which is to be deposited into each mold is determined by the speed of operation. Our invention differs from such continuous flow devices in that the judgment of the operator controls the amount of glass which is deposited in successive molds.

Although the amount of glass discharged in each mold is wholly within the control of the operator and is not limited to the capacity of the bushing 25, we prefer to make the capacity of a size commensurate with the quantity of molten glass desired to be deposited in each mold. This enables the operator to reduce to a minimum the period between opening and closing movements of the gate member and consequently shortens the time during which it is necessary to position each mold of the molding machine under the faucet in order to deposit the required quantity of glass therein.

Since the details of the invention may be varied without sacrificing its benefits or advantages, the scope of the invention must be determined by reference to the appended claims.

We claim—

1. In a faucet for delivering molten glass, the combination of a fire-proof receptacle containing fluid glass and provided at its under side with a downwardly directed discharge orifice, a metal inclosure under said orifice, its upper end being closed by the receptacle and in communication with said discharge orifice, means for opening and closing the bottom end of said inclosure, said inclosure when closed constituting a temporary receiver for limiting the flow of glass issuing from said orifice and being of greater cross sectional area than said discharge orifice so that when the inclosure is open at its lower end the discharging stream of glass does not touch the inclosure and means for cooling said inclosure and thereby chilling the unsupported surface of the stream of glass issuing from said orifice.

2. In a faucet for delivering molten glass, the combination of a fire-proof receptacle containing fluid glass and provided at its under side with a downwardly directed discharge orifice, an upwardly converging tapering metal inclosure under said orifice, its upper end being closed by the receptacle and in communication with said discharge orifice, means for opening and closing the bottom end of said inclosure, said inclosure when closed constituting a temporary receiver for, and limiting the flow of, glass issuing from said orifice and being of greater cross sectional area than said discharge orifice so that when the inclosure is open at its lower end the discharging stream of glass does not touch the inclosure, and means for cooling the wall of said inclosure so as to chill the unsupported outer skin of the stream of glass issuing from said orifice.

CHARLES H. HUBBARD.
GEORGE RUPPERT.